UNITED STATES PATENT OFFICE.

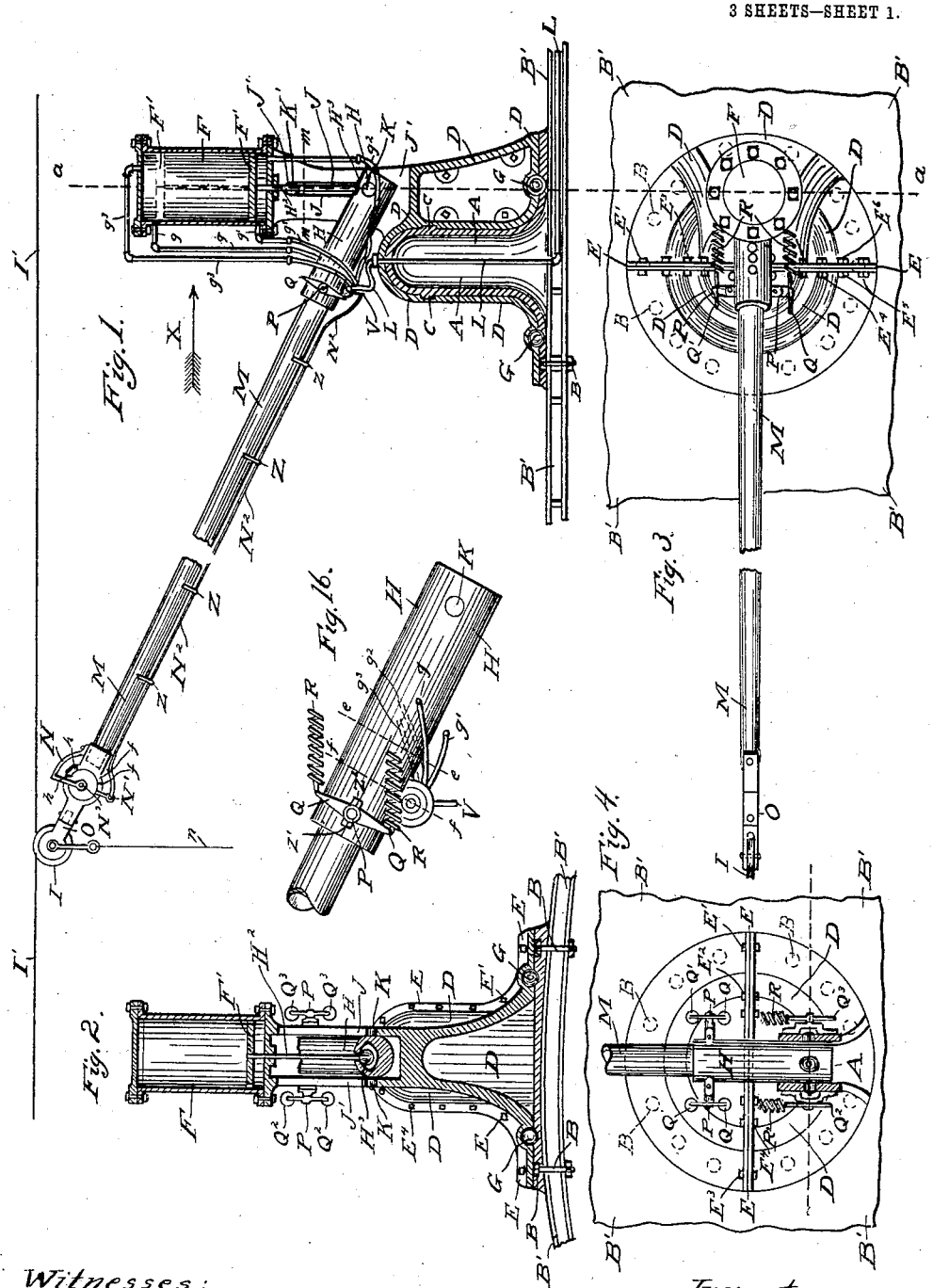

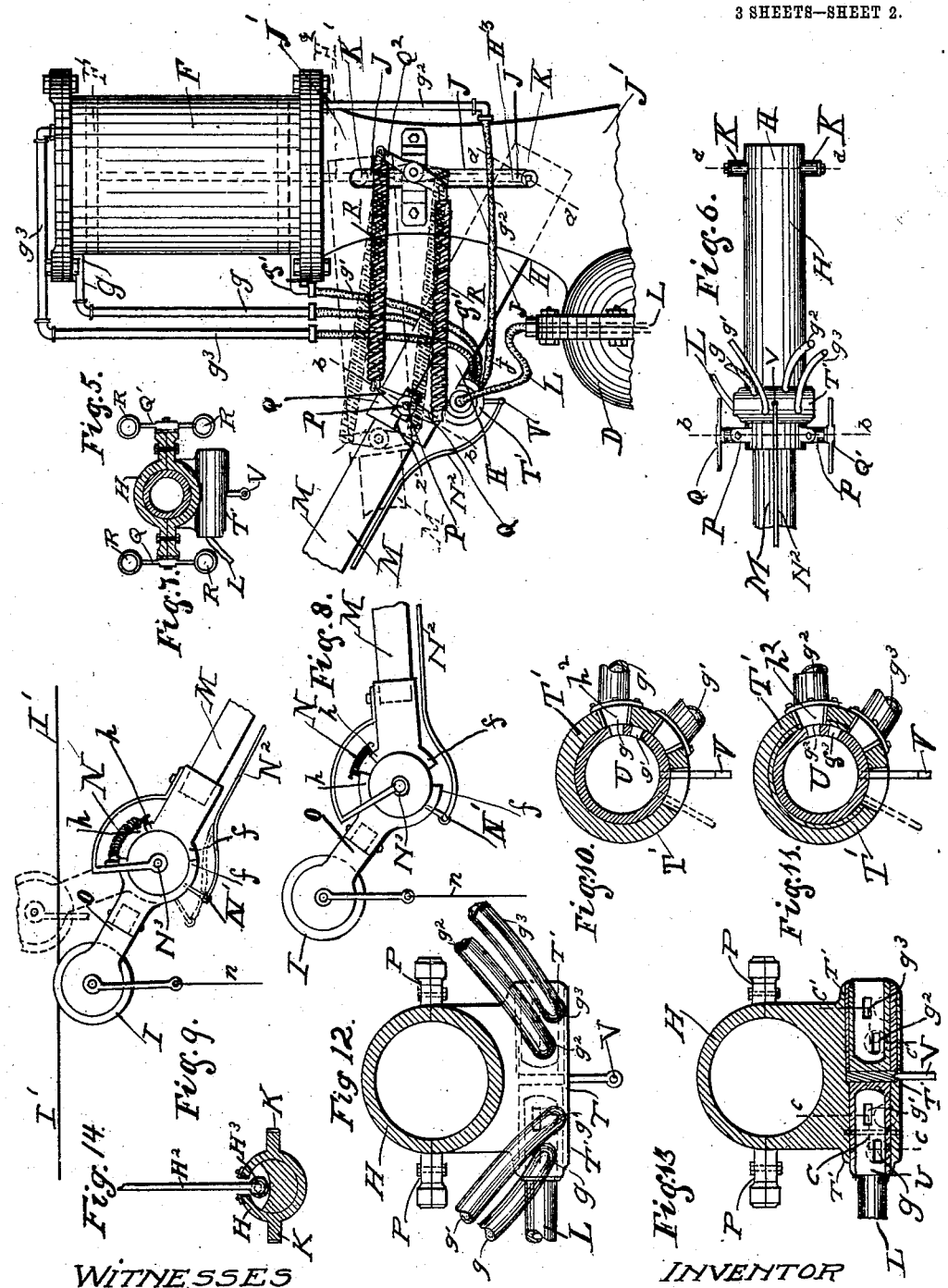

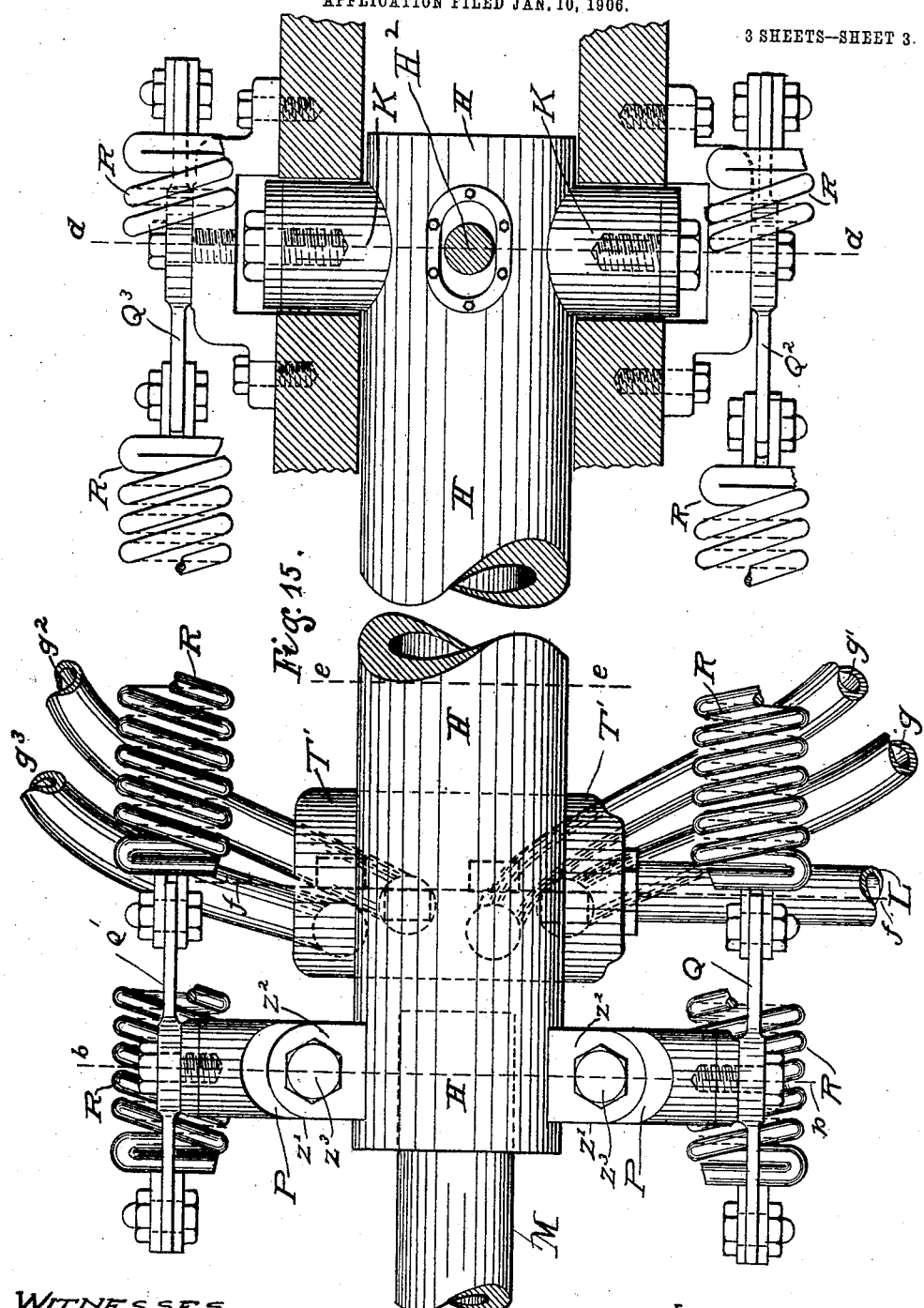

SAMUEL EZRA BELCHER, OF LOS ANGELES, CALIFORNIA.

TROLLEY DEVICE.

No. 863,690.　　　　Specification of Letters Patent.　　　　Patented Aug. 20, 1907.

Application filed January 10, 1906. Serial No. 295,400½.

*To all whom it may concern:*

Be it known that I, SAMUEL EZRA BELCHER, of the city of Los Angeles, in the county of Los Angeles and State of California, have invented a new or Improved Trolley Device for Use in Connection with the Railway-Cars and Overhead Conductor of Electrically-Operated Railways, of which the following is a full, clear, and exact description or specification, reference being had to the annexed drawings, and to the letters and figures marked thereon.

This invention has for its object to enable the trolley wheel of electrically operated street railways, to be readily engaged and reëngaged with the overhead conductor of such railways, on any occasion when the trolley has become disengaged from the overhead conductor from any cause whatsoever.

The trolley carrying pole and its connections are so constructed, operated and maintained in their position on the top of the railway cars, that whenever a disengagement of the trolley wheel with the overhead conductor takes place, at the same instant a short upper part thereof, which immediately carries the trolley wheel becomes raised upwards at an angle upon a pivot near the upper end of the trolley pole, while the whole of the pole parts of the device are at the same time lowered to the horizontal or nearly horizontal position; the whole device consisting of the mechanism shown upon the annexed sheets of drawings, and hereinafter described.

Upon the annexed drawings; Figure 1, is a view of the device constituting my invention, partly in vertical section and partly in elevation, shown with the parts in their operative positions, and the trolley wheel in contact with the overhead conductor. Fig. 2, is a vertical section looking towards the arrow X, Fig. 1, and taken on the line $a$, $a$, Figs. 1 and 3. Fig. 3, is a plan of some parts shown in Figs. 1 and 2. Fig. 4, is a plan corresponding with Fig. 2, but in which the compressed air cylinder shown in Fig. 2, is omitted. Fig. 5, is a side elevation of the upper part of the compressed air operative portions of the device, drawn upon a larger scale than that which is shown at Figs. 1 to 4, also showing the manner whereby the lower end of the trolley pole is fastened into the pole holder, the valve-casing, the admission and exhaust passages, and the springs and levers whereby the apparatus is also in part operated, as hereinafter described. Fig. 6, is a plan of the under side of the trolley pole holder, the admission and exhaust passages, also the valve-casing double the size in which these parts are shown in Figs. 1, 2, 3, and 4, and portions of their flexible tubular attachments to the air cylinder, as seen looking upwards from below. Fig. 7, is a transverse section on the line $b$, $b$, Figs. 5 and 6. Fig. 8, is a side elevation, on a larger scale, of the upper part of the trolley device, when it has become disengaged from the overhead conductor. Fig. 9, is an elevation of the upper end of the trolley device in the straight or operative condition, and on the same scale as Fig. 8. Fig. 10, is an enlarged transverse section on the lines $c$, $c$, Fig. 13, showing the pipe and ports for admitting the compressed air above or beneath the piston in the compressed air cylinder. Fig. 11, is a transverse sectional view on the line $c'$, $c'$, Fig. 13, for opening the exhaust ports of the compressed air cylinder, all as hereinafter described. Completer details of these exhaust and admission ports, and of the valve and passages, by which compressed air is led into and exhausted from the air operated parts of my device are shown on a smaller scale at the bottom parts of Figs. 12 and 13, respectively, Fig. 13, showing a longitudinal section of the valve and the ports therein. Fig. 14, represents a transverse section on the line $d$, $d$, Figs. 5, 6, 14 and 15, of the carrier of the lower end of the trolley pole, and the piston rod held within this part of the device by means of a ball, and operated as hereinafter explained. Fig. 15, is a plan of the trolley pole holding part of the device, and the compressed air admission and distributing valves, their spring connections, the pivots and levers, with the central part of this portion of the device broken out, and on a larger scale than that of the sections Figs. 12 and 13, the whole of which is operated substantially as hereinafter described. Fig. 16, is a side elevation of the lowest part of the pole and its holder, valve-casing, levers and operating springs, also the air pipes or passages, on the same scale as Fig. 6, that is to say, on double the scale shown at Figs. 1 to 4.

The entire apparatus constituting my invention is carried as is shown at Figs. 1, 2, 3, and 4, so as to be capable of rotation upon the vertical axis, constituted by the vertical pivot A, attached by bolts B, to the roof B', of the railway car, but as more especially seen in sections at right angles to each other, Figs. 1 and 2. In the drawings, the car is supposed to be traveling in the direction of the arrow $x$, Fig. 1.

The pivot A, is preferably formed with an annular projection C, at its upper part, as shown at Fig. 1, and the two halves of the lower part of the housing D, by which the trolley device is carried vertically and rotatively upon the pivot A, are united together at a central plane marked E, by bolts marked E', E$^2$, E$^3$, E$^4$, E$^5$, E$^6$, etc., as shown more especially at Figs. 2, 3, and 4. When the two parts of the housing D and D, respectively, are thus held together, not only are they maintained as fitting rotatively upon the flange or projection C, but antifrictionally by means of the rollers G, inserted in the half-groove formed respectively in the bottom of the pivot A, and in the foot or lower part of the housing D. By means of the projecting ring C, and the groove in the housing D, inclosing and fitting it, also the anti-friction rollers G, G, the apparatus is so supported that very little friction occurs when it is rotated in its vertical axis, upon the pivot A, while the projection or ring C, at the upper part of the pivot A, and fitting into the two halves of the housing D, prevents the trolley carrying apparatus being insecure, or from being removed from the vertical pivot A, excepting by the intended practice of occasionally removing the same from off the pivot A, by undoing the bolts E′, E², E³, etc., and taking the parts asunder for cleaning and repairing. At the rear upper part and above the housing D, there is carried the compressed air cylinder F, wherein the piston F′, operates. The piston F′, is connected by the piston rod H², and ball H³, Fig. 14, to the lower end of the upper part of the trolley pole holder H, as shown in the drawings. By admitting compressed air into the cylinder F, at the upper part thereof, the piston F′, being thereby depressed, maintains the trolley device in the position shown at Figs. 1, 5 and 9, that is to say, in the position wherein the trolley wheel I, is raised up into electrically operative contact with the overhead conductor wire I′. To enable the piston rod H², to remain always in a practically vertical position, it is connected to the ball H³. The outer portions of the projections K, operate in the vertical guides J, in the two upright side frames J′, rising from the housing D, below and carrying the cylinder F, at the upper end thereof. In this manner a fixed and determinate position of the ball H³ in a vertical plane, always constitutes an abutment which resists and reacts against any pressure which may be exercised, by any movement of the trolley pole and its connections, caused by the weight of the conductor I′, or by accidental disengagement of the trolley wheel I, downwards.

The projection marked K, in Fig. 5, represents the projection in its lowest position, and the projection K′, the same in its uppermost position.

The pipe L, Figs. 1, 5, 6, 7, 12, 13 and 14, of the annexed drawings, is the pipe which is connected with the compressed air reservoir of an electric railway car. This reservoir not being any part of my invention is not shown in the drawings. This pipe L, is preferably led upwards through the center of the pivot A, and housing D, as shown at Fig. 1. Such reservoir may be that which is used for operating the brakes of the car, or a separate reservoir may be used. This pipe L, leads compressed air into the interior of the apparatus through the annular partially rotating valve U, Figs. 10 and 13, contained therein, which leads into the upper port of the cylinder F, through the pipe $g$, leading from the port $g$, Fig. 13, so that the compressed air passes into the cylinder F, above the piston F′. This compressed air in thus passing into the cylinder F, above the piston F′, depresses it and the piston rod H², and the ball H³, thereby raising the trolley pole M, from the approximately horizontal position shown in dotted lines at the right hand end of Fig. 5, into the operative inclined position shown both at the left and right hand ends of Figs. 5 and 9. This inclined position is as aforesaid that which corresponds with the contact of the trolley wheel I, with the overhead conductor I′, and the trolley pole and its attachments are maintained in the position shown at Figs. 1, 5 and 9, by the action of the compressed air upon the upper side of the piston F′, and by the other actions or functions of my device herein described.

Should it happen, as it so frequently does, that from a variety of causes, inherent to the operation of trolley devices that the trolley wheel I, becomes disengaged from, or moves out of contact with the overhead wire I′, then the spring N, Fig. 9, through being no longer maintained in tension by the weight of the overhead conductor I′, contracts as shown at Fig. 8, so that the contraction of the spring N, draws the pivoted shoulders $f$, $f$, apart from each other, and simultaneously draws the shoulders $h$, $h$, towards each other, thereby raising the upper arm O, of the trolley pole into the position shown in full lines at Fig. 8, and in dotted lines at Fig. 9, that is to say, above and out of contact with the overhead conductor I′. When the upper end of the trolley device is in the position now herein last described, the tendency of the spring N, is to maintain it not in contact with the overhead conductor, and to cause the upper part of the trolley device to strike against the cross wires by which the overhead conductor is carried, in such a way as to injure the same, but by reason of the further parts of my invention now to be described, this tendency of the upper parts of the trolley pole to injuriously affect the cross wires, is prevented.

At the front end of the cylinder H, there are carried the pivots P, upon which two arms Q and Q′, are pivotally carried, as shown at Figs. 1, 2, 3, 4, 5, 6, 15 and 16. To the outer upper end and lower ends of the arms Q and Q′, a stiff spiral spring R, is firmly fastened. The tendency of these springs is to maintain the trolley pole holder H, and the trolley pole M, in the upraised position shown in the drawings, but the instant that disengagement of the trolley wheel I, from the overhead conductor I′, should take place, then the rod N′, controlling the valve U, and ports $g$, by which compressed air is led into the under side of the piston of the cylinder F, and exhausted from the upper side of the piston in the said cylinder, permits of the partial turning round of the cylindrical valve U, Figs. 10, 11 and 12, within its casing T′, and in this manner, the exhaust port $g^3$, in the valve U, becomes open to the other flexible pipes $g^3$, and $g^3$, leading to the upper end of the cylinder F, so that the upraised end of the trolley pole and its connections move downwards simultaneously, by the lower part of the trolley pole holder H, being raised by the upward movement of the piston F′, that is to say, into an approximately horizontal position shown in part by the dotted lines in Fig. 5, whereby complete disengagement of the trolley wheel I, from the overhead conductor I′, is effected.

So soon as the device and mechanism are in condition for being elevated so that the trolley wheel I, and overhead conducting wire I′, can again be thrown into operative contact, the valve U, containing the port $g$, Fig. 10, operated as hereinafter described, admits compressed air to the upper side of the piston F′, through port and pipe $g^3$, to the upper end of the cylinder F, and because of the exhaust of the compressed air on the under side of the said piston being simultaneously effected by means of the arm N′, operating the handle V, Figs. 1, 5, 6, 9, 10, 11, 12 and 15, and turning the valve U, so as to open the port $g^3$, and close the port $h^2$, through which compressed air exhausted below the piston in the cylinder F, escapes by the pipe $g^2$. In this condition, the piston being at the top of the cylinder F, is ready for being lowered to move the trolley device upon its pivot K, and thereby to lift the trolley I, in operative contact with the overhead conductor I'.

In order to insure that there shall be no irregularity in the operating of the trolley pole and the holder H, in which the lower end of the trolley pole is fastened, as hereinbefore mentioned, the pivots K, at the lower end of the holder H, being as aforesaid, movable upwards and downwards in the vertical slots J, of the framing J', there is carried at the upper end of the holder H, and opposite to each other a two arm lever Q, and a similar two arm lever Q' to the upper and lower ends of which, respectively, helical springs R, are connected and to similar two armed levers $Q^2$, and $Q^3$, as shown at Figs. 3, 4, 5 and 15. When the compressed air above the cylinder F, has forced the piston F', and the piston rod $H^2$, to the lowest position, then the holder H, and the trolley pole M, become raised upwards, and as the pressure of the trolley wheel I, against the overhead conductor I', takes place, then the lever O, constituting the upper part of the trolley pole M, becomes straightened out into its operative position by the stretching of the spring N, from the position shown at Fig. 8, to the position shown at Fig. 9, when the arm O, becoming moved round its pivot until the stops $f, f$, close against each other, when all the parts remain in straight line and in their operative positions. When this movement of the arm O, upon its axis takes place, then it pushes the rod $N^2$, rearwards and downwards, until the lever V, is in such position that the valve U, is turned in its socket in the casing T, to maintain passage of the compressed air above the piston in the cylinder F. The parts of this apparatus shown dotted in Fig. 5, illustrate the position of the several parts of the trolley device when the trolley is in a horizontal or nearly horizontal position, that is to say, when out of contact with the overhead conductor I', hereinbefore referred to.

When it is desired from any cause for the trolley wheel I, to be lowered out of contact with the overhead conductor I', such for example as when it is necessary for the conductor of a railway car to rotate the apparatus upon the pivot A, then the conductor of the car, takes hold by his hands of the rope $n$, Figs. 8 and 9, and pulls the trolley pole and its connections downwards, so as to free it from the overhead conductor I'. When so held down, the device is capable of being turned round upon the pivot A, to the opposite angle, for the purpose of enabling the car to travel in the opposite direction. This rope $n$, is also available for being used by the train or car conductor for the purpose of replacing the trolley wheel I, in engagement with the overhead conductor I', at any time after an accident or emergency rupture shall have occurred to cause the trolley I, and the arm O, to be raised upwards, and the apparatus operated otherwise as herein before described.

For the purpose of maintaining the rod $N^2$, stiff in its place beneath the trolley pole M, the trolley pole M, is provided with metallic loops Z, which suspend the rod $N^2$, as shown more particularly at Fig. 1, of the annexed drawings. For the purpose of maintaining the trolley pole M, rigid in its connection with the holder H, the rear end of the holder H, is split diametrically across in both walls of its cylindrical structure, that is to say, as shown at Z', Figs. 1, 5 and 16. Near the outer rear end of these splits lugs $z^2$, are formed, Figs. 15 and 16, and through these lugs $z^2$, bolts $Z^3$, pass, upon tightening which by their screw nuts, the split rear portions of the holder H, are sprung down upon the lower end of the pole M, whereby the said pole is firmly gripped and held rigidly in place.

Having now described the nature of my said invention, and the best system, mode or manner, I am at present acquainted with for carrying the same into practical effect, I desire to observe in conclusion that what I consider to be novel and original, and therefore claim as the invention to be secured to me by Letters Patent is as follows:

1. The trolley device for electrically operating vehicles, consisting of a pivoted holder carrying the trolley pole, the holder connected to the piston operable vertically in a cylinder by compressed air, the cylinder, the piston and means connecting it to the holder, the duplex pivoted levers, the rear pair of such levers carried pivotally at the rear end of the trolley pole holder, the front pair of such levers carried pivotally upon the frame guides which support the air cylinder, the springs connecting and regulating the movement of the said levers in relation to the pivotal position of the trolley pole holder, the pivoted upper end of the trolley pole, the spring connecting the transversely pivoted parts, the stops limiting the extent of movement of the upper movable part of the trolley pole and trolley wheel, the downwardly projecting arm of the movable upper part of the trolley pole, the link or rod connecting said arm to the lever for operating the compressed air valve, the lever, the compressed air valve substantially as set forth.

2. The trolley device for electrically operating vehicles, consisting of a pivoted holder carrying the trolley pole, the holder connected to the piston operable vertically in a cylinder by compressed air, the cylinder, the piston and means connecting it to the holder, the duplex pivoted levers, the rear pair of such levers carried pivotally at the rear end of the trolley pole holder, the front pair of such levers carried pivotally upon the frame guides which support the air cylinder, the springs connecting and regulating the movement of the said levers in relation to the pivotal position of the trolley pole holder, the pivoted upper end of the trolley pole, the spring connecting the transversely pivoted parts, the stops limiting the extent of movement of the upper movable part of the trolley pole and trolley wheel, the downwardly projecting arm of the movable upper part of the trolley pole, the link or rod connecting said arm to the lever for operating the compressed air valve, the lever, the compressed air valve the central vertical pivot, the central pipe in said pivot conveying compressed air to the valves and cylinder, the housing inclosing and carried upon said pivot, the flange at the lower part of the housing, the flange of the pivot, the anti-friction rollers operating in grooves in the flanges of the housing and of the pivot, all substantially as set forth.

3. The trolley pole holder consisting of a cylindrical hollow body, whose rear end is split for some distance into the body, said split parts having lateral projecting lugs for receiving tightening bolts, which on being tightened draw together the parts of the holder containing the splits, the pivots of the holder, the socket and ball joint connecting the holder to the piston of the compressed air cylinder, the piston, the cylinder, the vertical guides for the ball and its projections, the admission and exhaust valves in the holder for conveying compressed air to and discharging exhaust air from the cylinder and piston, all operating together substantially as hereinbefore described.

In testimony whereof, I, the said SAMUEL EZRA BELCHER, have hereunto set my hand and seal at Los Angeles aforesaid, in the presence of two subscribing witnesses.

SAMUEL EZRA BELCHER. [L. S.]

Witnesses:
 ST. JOHN DAY,
 DON C. PORTER.